Feb. 1, 1966 P. A. F. FERRAND ETAL 3,232,546

DEVICE FOR CONTROLLING SPEED FOR REELING-OFF TAPE IN TAPE RECORDER APPARATUSES AND THE LIKE

Filed Oct. 4, 1963 3 Sheets-Sheet 1

United States Patent Office 3,232,546
Patented Feb. 1, 1966

3,232,546

DEVICE FOR CONTROLLING SPEED FOR REELING-OFF TAPE IN TAPE RECORDER APPARATUSES AND THE LIKE

Pierre Alain Francis Ferrand, Clamart, and Jean Pierre Eugene Hommeau, Paris, France, assignors to Compagnie des Compteurs, Paris, France, a company of France Filed Oct. 4, 1963, Ser. No. 313,874
Claims priority, application France, Oct. 9, 1962, 911,665
11 Claims. (Cl. 242—55.12)

The present invention relates to a device for controlling the speed of tape, particularly high-speed magnetic recording tapes adapted for running in opposite directions with a very short starting and stopping time, in which information is transmitted in electronic calculators.

The drive mechanisms, for magnetic or paper tape, cause the tape to be driven at a constant speed in front of reading or recording devices. In particular, in magnetic tape apparatus, it is important that the tape be maintained at a constant tension against the reading and recording heads to enable correct transmittal of the information on the tape, whatever the running direction of the latter.

In apparatus of the above type, it is also very important to be able to obtain an extremely short starting and stopping time, in the order of milliseconds. To this end, provision is generally made to intercalate between the means which drives the tape at its working speed and the delivery and receiving spools for the tape, an intermediate reserve which must provide a dual function:

(1) Maintain constant tension of the tape against the recording and reading heads, (2) Enable winding and unwinding of the tape on the spools at a constant mean speed, independent of the amount of tape on the spools, while being free from considerable stresses which may appear on the spools, due to their inertia and considerable accelerations of the tape.

Known apparatus comprises for each of the spools, a pivotally supported tension arm forming, one or more loops for the tape between the spool and the tape driving means, the spools themselves being driven by a motor. This tension arm plays the part of an intermediate reserve and moves to either side of a median reference position according to whether the tape is subjected in the loops thus created at the entry or exit from the spool, to a tension lower or higher than a nominal tension, particularly when starting or stopping.

A known solution for bringing the arm to its reference position consists of controlling the direction and speed of the motor of the spool to in accordance with the angular deviation of each arm with respect to the reference position thereof. This has several disadvantages. On the one hand, it is necessary to wait until the arm has left its reference position until the motor of the spool is operative while, on the other hand, the voltage at the terminals of the motor is variable proportionally to the angular deviation of the arm in relation to its reference position, and consequently is slight at the beginning. In this way, it is not possible to obtain a sufficiently rapid control for obtaining the extremely short starting and stopping times that are desired.

In another known solution, the auxiliary motors of the spools are fed under constant voltage, and the deviation of the tension arm on one side of its reference position causes a brake to be applied on the driving shaft of the spool, whose rotation is thus slowed down until the tension of the tape has been brought to its nominal value. But the fact that the brake is only operated by the arm when the latter deviates to one side of its reference position makes this device solely applicable to a particular running direction of the tape, and does not ensure correct operation in the opposite running direction of the tape.

The present invention has as an object to provide a device for controlling the speed of the tape entering and leaving the spools which enables both an extremely short starting and stopping time, and an unwinding of the tape in either direction.

In the controlling device according to the invention, the tape is driven by drive means located between a delivery spool and a receiving spool, which are each associated with an auxiliary driving motor. A pivoting tension arm moves in relation to a reference position for controlling a device for the mechanical braking of the motor of the spool so that the tension of the tape remains appreciably constant, the controlling device is characterized, on the one hand, in that the driving motors of the spools are fed under constant voltage, and that on the other hand, each braking device comprises two brakes acting on the driving shaft of the spool when the tension arm deviates from its reference position, by means of two free wheels, arranged with the transmission direction of opposed movement, so as to make only one brake effective for each direction of travel of the tape.

The invention will be described by reference to the attached drawings, which show, by way of example, a particular embodiment of the invention.

Figure 2:
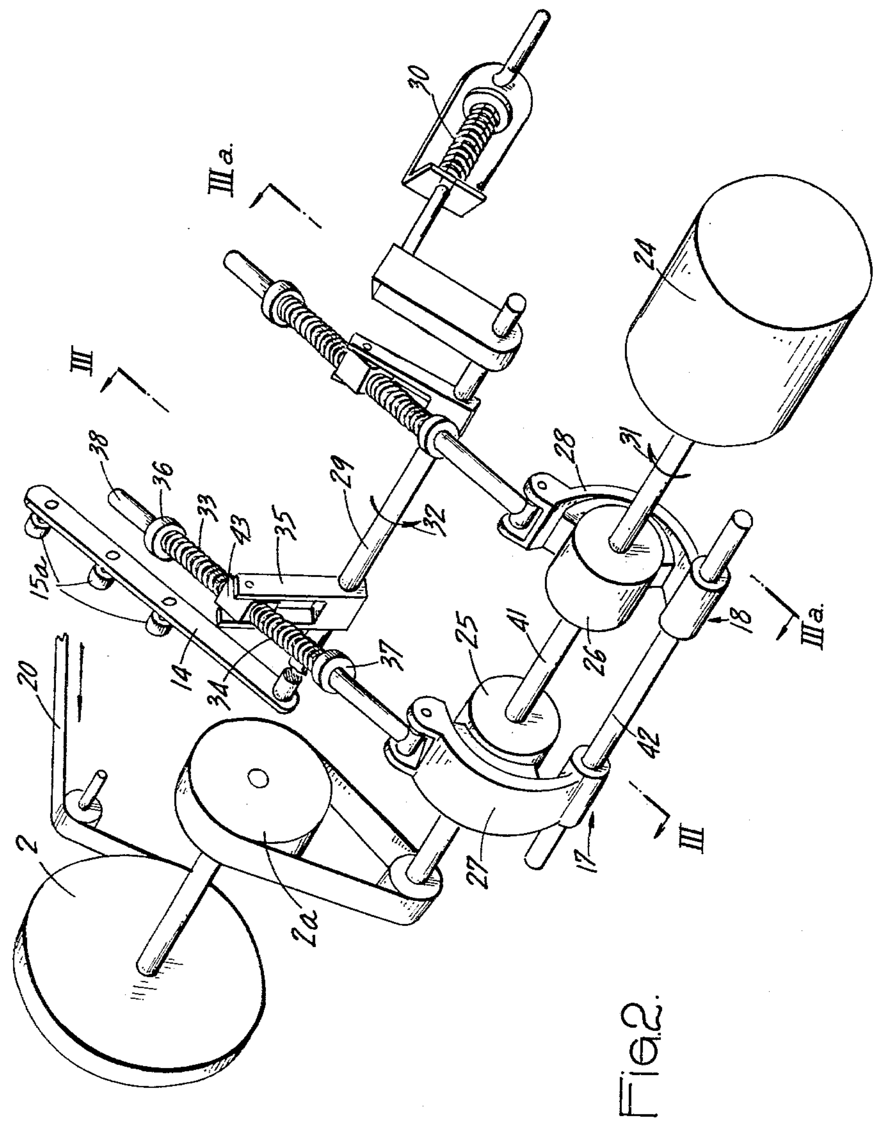
FIGURE 2 shows a perspective view of one of the controlling devices according to the invention.
Figure 3A:
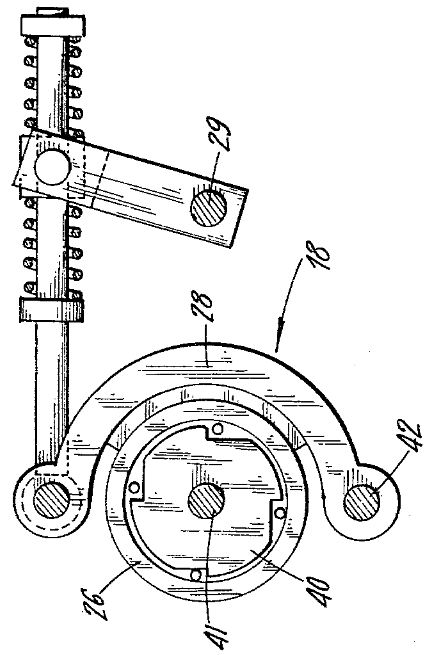
FIGURE 3 shows in elevation and in greater detail, the controlling mechanism as seen along the line III—III of FIG. 2.
Figure 3:
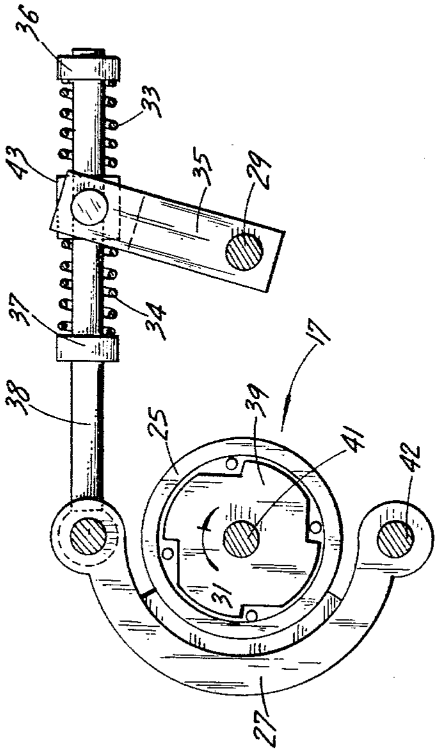

FIGURE 3*a* shows, in a similar way to FIG. 3, the controlling mechanism seen along the line III*a*—III*a* of FIG. 2.

In the following description the forward running direction of the tape will be from the upper spool to the lower spool, with both spools rotating in a counterclockwise direction as viewed from in front of the face of the platen.

Figure 1:
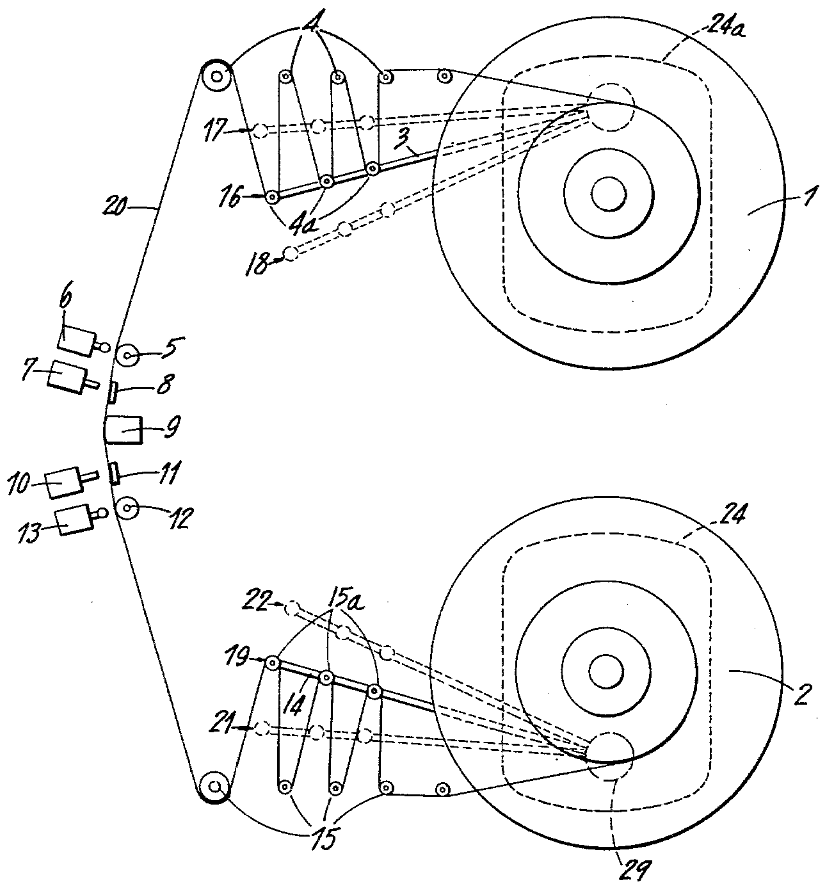
FIGURE 1 shows diagrammatically a front view of the platen.

In FIG. 1, there is shown the front face of the platen and the path of the tape 20 between the upper spool 1 and the lower spool 2.

A pivotally supported tension arm 3 is associated with the spool 1 and a pivotally supported arm 14 is associated with spool 2. Rollers 4, **4*a*, and 15, 15*a* define loop paths around which the tape passes and constitute respectively intermediate reserve of tape. The tape is driven by a capstan 5 and a pressure roller 6 in the reverse direction of travel, while capstan 12 and pressure roller 13 drive the tape in a forward direction. A brake 7 and its fixed block 8 are positioned along the path of the tape such that the tape passes between brake 7 and block 8 and numerals 10 and 11 represent respectively a second brake and its fixed block. The magnetic head is indicated by numeral 9**.

Each spool 1, 2 is driven by an auxiliary motor 24, **24*a*, fed at constant voltage for rotating in a given direction as soon as one of the pressure rollers 6 or 13** for forward or reverse running is put into operation.

In operation in a forward direction, the forward running pressure roller 13 is operated and the motors 24, **24*a* of the spools 1, 2 are driven in a counter clockwise direction, while for operation in a reverse direction pressure roller 6 is operated and the motors of the spools 1, 2 are driven in a clockwise direction. In order to stop the tape the brakes 7 and 10 are applied and the supply current of the motors 24, 24*a*** which are driving the spools is interrupted.

A necessary operative condition is that the mean linear speed of the tape leaving or entering the spools be constant and equal to the working speed of the tape, whatever the direction of travel thereof, i.e., either forward or reverse.

This condition is achieved by means of the controlling device according to the invention shown in FIG. 2 and shown for the lower spool, as seen from the rear of the platen. Of course, a similar controlling device is provided for the upper spool. In FIGURES 2, 3 and 3*a*, there is seen the lower spool 2 on to which the tape 20 winds, and the auxiliary driving motor 24 for this spool.

The shaft 41 of the motor 24 drives the spool 2 by means of a belt and pulley 2*a*. For operating on the shaft 41, there is provided a braking device composed of two brakes 17 and 18. These brakes are respectively formed by jaws 27, 28 acting respectively on drums 25, 26 whose mechanical connection to the shaft 41 is made by means of the free wheels 39, 40, shown in more detail in FIGS. 3 and 3*a*. As shown in FIGURES 3 and 3*a*, the free wheels 39 and 40 transmit a drive in opposite direction, the shaft 41 driving the drum 25 when the shaft 41 rotates clockwise in FIG. 3 (direction of the arrow 31, corresponding to forward running), the drum 26 remaining free for this direction of rotation of shaft 41. On the other hand, when the shaft 41 rotates in the opposite direction (counter clockwise) the drum 26 is driven, the drum 25 remaining free.

The jaws 27 and 28 of the brakes 17, 18 have one end articulated around a fixed pin 42, the other end being connected by suitable means to the pivoting pin 29 of the arm 14 (FIGS. 1 and 2), associated with the spool 2. The connection of brake 17 to pin 29 is effected, for example, by means of a fork 35, suitably keyed to the pin 29, and in which a bushing 43 pivotally supports a control rod 38 of the brake 17. The bushing 43 is between two springs 33, 34 whose stiffness can be regulated by movable abutments 36, 37.

The brake 18 comprises a similar connection to the pin 29, the jaw 28 being oriented however so as to apply a force against its drum 26 when rotation of the pin ence position, the jaws 27, 28 of the brakes 17, 18 are 25, and vice versa.

When the tape 20 is stopped, the tension in the tape is obtained by a spring 30 which exerts a torque on the pin or spindle 29 tending to raise the arm 14 towards the center of the platen up to a reference position for which a sufficient reserve of tape is stored in the loops between the rollers 15*a* of the arm 14 and the rollers 15. Forks such as 35 are keyed to the spindle 29 so that in the position of the arm 14 corresponding to the reference position, the jaws 27, 28 of the brakes 17, 18 are in contact with the drums 25, 26.

The controlling device operates in the following manner. The forward movement of the tape is initiated by urging pressure roller 13 against capstan 12, while simultaneously, the motor 24 is fed with a nominal voltage and rotates in the direction of the arrow 31.

Due to the inertia of the spool 2, and the great acceleration of the tape spool 2 has not had time to absorb the tape delivered. Thereby the reserve increases and the arm 14 passes from the initial position 19 to the position 22 shown in broken lines (FIG. 1). The spindle 29 of the arm 14 thus pivots in the direction of the arrow 32 (FIG. 2) and the jaw 27, which was initially applied against the drum 25, moves away from the latter. The pivoting of spindle 29 also has effect of causing the tightening of the jaw 28 against the drum 26, but as explained, this tightening has effect on the forward running shaft 41, due to the interposition of the free wheel 40.

The motor 24 can thus rotate freely and reach a higher speed such that the tape is wound on the spool 2 at a speed greater than the working speed. The reserve then diminishes, causing the spindle 29 to pivot in the direction opposite to that of the arrow 32, to apply the jaw 27 to the drum 25 to develop a braking force which is transmitted to the shaft 41, by the free wheel 39. The motor 24 slows down until its speed is such that the tape is wound on the spool at a mean speed equal to the working speed of the tape.

Damping is effected by means of springs 33 and 34.

The operation in the reverse direction of tape feed is identical. The spool 2 must, in this case, deliver the tape, but upon initial starting, the spool lags in feeding tape due to its own inertia. The arm 14 descends from position 19 to position 21, shown in broken lines, FIG. 1, which has the effect of causing the spindle 29 to pivot in an opposite direction to that of the arrow 32 and thereby move the jaw 28 away from the drum 26. The spindle 41 is revolving in a direction reverse to arrow 31 and the consecutive application of the jaw 27 to its drum 25 has no action on the shaft 41 since the drum 25 is disengaged from shaft 41 by the free wheel 39. The operation continues as in the preceding case, and the arm becomes stabilized when the speed of unwinding of the tape becomes equal to the working speed.

During the sudden reversal in the direction of the tape, the free wheel instantaneously acts and the control immediate operates in the corresponding direction, which thereby avoids the problems heretofore encountered of too long a responding time of the control on similar apparatus.

Although the invention has been described in relation with a particular embodiment, modifications can be made to this embodiment without departing from the scope of the invention. More particularly, the jaw brakes could be replaced by hand brakes, or by equivalent means.

We claim:

1. Drive means for the spool of a tape recorder in which tape can be suddenly driven in opposite directions under constant tension towards and away from the spool to be respectively wound and unwound from said spool, said drive means comprising a movable member which engages the tape adjacent the spool to provide a series of loops in the tape leading to the spool, said member having a neutral position in which the tape is maintained at a tension equal to the tension of the driven tape and being movable in either direction from said neutral position to compensate for variation in tension in said tape adjacent the spool upon sudden starting and stopping of the advancing of the tape, said drive means further comprising reversible power means for driving said spool, means connecting said power means to the spool in driving relation and selectively operable mechanical braking means connected between the movable member and the means connecting the power means to the spool for respectively applying force to the latter means for slowing down the drive to said spool and speeding up the drive to said spool dependent upon the direction of movement of the movable member and the direction of drive of the power means.

2. Drive means as claimed in claim 1 wherein said power means includes a driven shaft, said braking means including a pair of brake means for respectively acting on said shaft, means connecting each of the brake means to the movable member to cause the brake means to move conjointly with respect to the shaft one closer towards the shaft and the other away from the shaft for each direction of movement of the movable member, said pair of brake means moving with respect to said shaft a distance related to the magnitude of movement of the movable member and means between the shaft and the pair of brake means for contacting each of the brake means to transmit force to said shaft selectively from each of the brake means in dependence upon the direction of rotation of the shaft.

3. A tape recorder comprising a pair of spaced spools adapted for having a continuous length of tape wound on said spools with a length of tape extending between said spools, means between said spools for engaging said tape for driving said tape in opposite directions with a particular tension in said tape, means for driving each of said spools, whereby the tape may be unwound from one spool and wound on the other of the spools as the tape is driven, a movable member operatively associated with each said spool and adapted for engaging said tape to define a looped portion of reserve tape adjacent the associated spool, said means for driving each of said spools including reversible drive means, and means connecting the last mentioned drive means with an associated spool in driving relation, said movable members each having a reference position in which the tension of the tape leading to the associated spool is equal to the tension in the tape established by the means which drives the tape, said tape recorder being provided with a device for moving the movable member selectively in either direction from the reference position upon variation of the tension in the tape in order to maintain constant tension in the tape, and means for each spool responsive to the movement of the associated movable member and including first and second brake means respectively and singularly operative on the means connecting the associated drive means with the particular spool for each direction of drive of the drive means such that one of the brake means slows down the drive to the spool when the associated movable member moves in one direction and speeds up the drive to the spool when the associated movable member moves in the other of the directions for a particular direction of drive, while in the other direction of drive the said one brake means is inoperative and the other of the brake means acts on the drive to the spool to speed up the same when the movable member moves in said one direction and to slow down the same when the movable member moves in said other direction.

4. A braking device for reversibly driven spool of a tape recorder in which a reverse supply of tape is provided adjacent the spool to compensate for speed differences between the tape and the spool arising from sudden changes of speed of the tape, the braking device being effective to vary the speed of the spool to match that of the tape, said braking device comprising first and second braking means, said spool being driven by drive means, means for moving said first and second braking means conjointly in two directions dependent upon the direction of speed difference between the tape and the spool, said first and second braking means having a common neutral position in which only one of said braking means operates on said drive means each for a different direction of drive of the spool, said braking means in the neutral position thereof being effective to maintain a particular speed of drive for the spool said drive means in each direction of drive thereof being operated on only by a respective one of said brake means such that for one direction of conjoint movement of said brake means the drive to the spool is slowed down while for the other direction of conjoint movement of said brake means the speed of the drive to the spool is increased.

5. Drive means for the spool of a tape recorder comprising a reversible power source including an output shaft for driving the spool, first and second braking devices for operating on said shaft to vary the speed thereof, a clutch device on said shaft for each brake device, said clutch devices respectively including means for transmitting force from the associated brake device to the shaft only for respective opposite directions of rotation of the shaft, and means supporting said braking devices for movement in opposite directions conjointly to respectively disengage one of the braking devices from the respective clutch device while engaging the other of the braking devices with the respective clutch device.

6. A magnetic tape recorder comprising driving means to drive said tape at constant speed, a set of two spools respectively located on both sides of said driving means for winding and unwinding said tape at variable speed, two electric motors each rotatable in opposite directions and supplied with constant voltage for driving said spools, two identical connecting transmissions respectively between each spool and each electric motor, each transmission comprising two undirectionally acting brake mechanisms having progressive action, and mounted in opposition for acting one at a time, a common control mechanism for the simultaneous actuation of said two brake mechanisms in which one brake mechanism is released and the other brake mechanism is operative and tension sensitive means actuated by said tape and mechanically connected to said control mechanism for actuation thereof.

7. A magnetic tape recorder comprising driving means to drive said tape at constant speed, a set of two spools for winding and unwinding of said tape at variable speed respectively in both directions during driving of said tape by said driving means, two electric motors rotatable in opposite directions and respectively coupled to said spools to drive the same, drive shafts between respective spools and the corresponding electric motor, two free wheel mechanisms mounted on each shaft and including means respectively providing positive engagement with said shaft for opposite directions of rotation of said shaft, friction members carried by each one of said free wheel mechanisms, two friction shoes oppositely directed and mounted to cooperate respectively with said friction members of the two free wheel mechanisms, a spring loaded controlling assembly for the simultaneous actuation in opposite directions of said friction shoes, said shoes normally being engaged with said friction members when said shaft carrying said free wheel is at rest and a spring loaded tension sensitive element in contact with said tape and connected to said spring loaded controlling assembly for actuation thereof during both the driving of said tape by said roller means and the driving of said spools by said electric motors.

8. A magnetic tape recorder comprising driving means to drive said tape at constant speed in both directions, two storage spools for said tape respectively provided on both sides of said driving means, two identical driving assemblies for driving said spools at variable speed during driving of said tape by said driving means, each one of said driving assemblies comprising an electric motor rotatable in opposite directions and supplied with constant voltage, a shaft driven by said motor, a right hand driven free wheel and a left hand driven free wheel both carried by said shaft to be driven thereby respectively in opposite directions of rotation of said shaft, a fixedly mounted axle extending parallel to said shaft, two brake shoes pivotally mounted on said axle and diametrically mounted in opposition with respect to the shaft, one of said brake shoes engaging said right hand driven free wheel and the other brake shoe engaging said left hand driven free wheel, two control rods respectively pivotally mounted on said brake shoes, adjustable spring member fitted onto said rods, fork members connected to said rods by means of said spring members, a common driving shaft supporting said fork members for rotation therewith, and an oscillating arm also supported by said driving shaft and provided with rollers for guiding said tape and for forming loops of tape between said rollers such that when said tape, which is driven by said driving means, causes said oscillating arm to angularly pivot, the two associated brake shoes are concurrently moved and only one is operable according to the direction of rotation of the shaft driven by the motor.

9. A magnetic tape recorder claimed in claim 8 further comprising a lever carried by said common driving shaft carrying said fork members and rotatable therewith and a spring connected to said lever to urge said common driving shaft to a neutral position in which when said tape recorder is at rest said two brake shoes engage said two free wheels and said oscillating arm carried by said common shaft is located in an intermediate position of the angular range thereof.

10. A magnetic tape recorder as claimed in claim 8 comprising a fixed roller cooperating with the rollers on each said oscillating arm to guide said tape from the driving means therefor to the corresponding spool.

11. A magnetic tape recorder as claimed in claim 8 wherein said free wheels each respectively include means to permit the associated brake shoe to act on the wheel without the transfer of force to the driven shaft for one direction of rotation of the shaft while in the opposite direction of rotation of the shaft the force of the brake shoe on the wheel will be transmitted to the shaft.

References Cited by the Examiner

UNITED STATES PATENTS

| | | | |
|---|---|---|---|
| 2,814,676 | 11/1957 | House | 242—55.12 X |
| 2,855,160 | 10/1958 | Fundingsland | 242—55.14 |
| 3,091,410 | 5/1963 | Widener | 242—55.12 |

FOREIGN PATENTS

| | | |
|---|---|---|
| 1,163,105 | 4/1958 | France. |

MERVIN STEIN, *Primary Examiner.*

L. D. CHRISTIAN, *Assistant Examiner.*